A. S. LYMAN.

Methods of Cooling and Ventilating Rooms.

No. 5,786. Reissued March 10, 1874.

Witnesses
Stephen Cutter
J. A. Piper

Azel S. Lyman

UNITED STATES PATENT OFFICE.

AZEL S. LYMAN, OF NEW YORK, N. Y., ASSIGNOR, BY MESNE ASSIGNMENTS, TO STEPHEN CUTTER.

IMPROVEMENT IN METHODS OF COOLING AND VENTILATING ROOMS.

Specification forming part of Letters Patent No. 14,510, dated March 25, 1856; extended seven years; reissue No. 4,683, dated December 26, 1871; reissue No. 5,786, dated March 10, 1874; application filed July 15, 1872.

*To all whom it may concern:*

Be it known that I, AZEL S. LYMAN, of the city, county, and State of New York, have invented certain new and useful Improvements in Cooling, Drying, and Disinfecting Rooms; and I do hereby declare that the following is a full, clear, and exact description of the same, reference being had to the annexed drawing, making a part of this specification—that is to say:

My improvement in cooling, drying, and disinfecting consists in the peculiar construction of the box or reservoir for holding the ice or other cooling material. The object sought to be accomplished by this construction is the production of a current of cool air in a determined direction, without mechanical aid and irrespective of place. The principle I employ is that which is exemplified in the hydrostatic column, and my use of it may be understood by the following comparison: If we suspend a cake of ice freely in the air, and near the ceiling of a closed room, slight currents would soon be produced by the disturbance of the equilibrium consequent upon the cooling of the air in contact with the ice. These currents would be feeble because the cold descending air would spread out over a wide base, and the temperature soon become equalized by mixing with warm air. If, however, we should place around the sides and under the ice a conduit, such as a pipe or box of sufficient size to surround the ice, the air, as it cooled, would fall down and soon fill the same, but still have a tendency to spread laterally in consequence of its gravity, and therefore it would exert pressure on all sides, similar to a non-elastic fluid. If one or more openings were made in the bottom of the same, this air would pour out with a certain force, due to the difference of temperatures outside and inside, and to the height of the column, obeying precisely the same laws which would govern a non-elastic fluid. The construction of a refrigerating-box on this principle enables me to employ it to various useful and valuable purposes, such as the preservation of meats and vegetables, ventilating, cooling, drying, and disinfecting apartments in hospitals, sleeping and other rooms.

Figure 1:
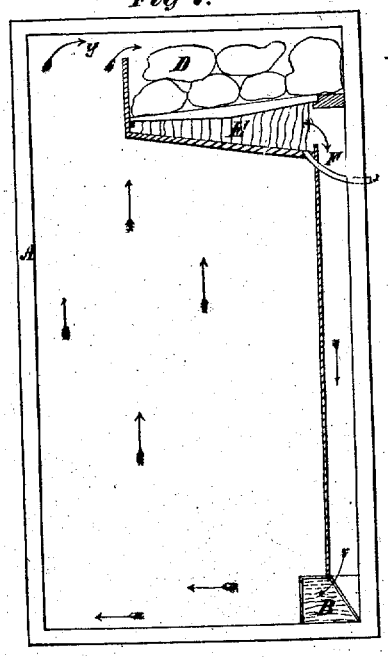

The reservoir, when adapted for holding ice as the cooling material, is a box open at or near the top and in or near the bottom. It may be divided into two compartments by a grating, as shown in Fig. 1. In such case, the latter serving to support the ice, while the space beneath may form a cold air-chamber, E, and allow the free settling of the cold air from all parts of the grate.

When inclosed in an air-tight compartment, as is shown in Fig. 1 at A, and the box D charged with ice, the moisture will be extracted from the air at the same rate that its temperature is reduced, in the following manner; The air in A is at first of the temperature of the surrounding mediums, and its hygrometrical condition is the same. Ice being now introduced into the box D, the air in contact will be immediately reduced in temperature, condensation takes place, and moisture is deposited. The condensed air, being of greater specific gravity, falls into the air-chamber E, flowing thence similar to the flow of water through F, downward to and spreading over the floor, and in doing so displaces the lighter and warmer air, forcing the latter upward toward the top of the apartment. As it there comes in contact with the ice, the condensation and precipitation of moisture goes on until a minimum temperature is reached. Thus a continual circulation is kept up in such manner that the whole of the air must circulate through the ice-box. Of course, all articles, such as meats and vegetables, would be deprived of their moisture in a like degree with the air, the latter being brought to the condition of great purity and dryness. The water falls to the bottom of the cold-air space E, where it may be caught by a trough or lip, and thence discharged to the outside by a suitable pipe.

Figure 2:
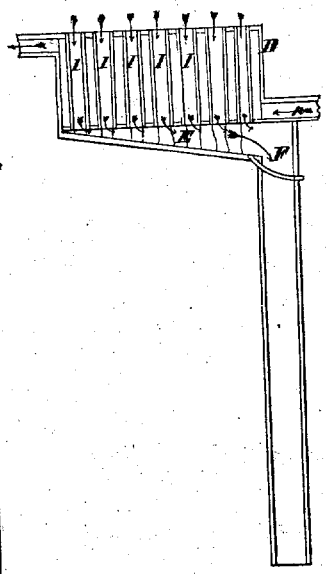

In cooling rooms, dairies, &c., I propose, where the locations allow of it, to employ cold spring or well water as the cooling element, for the production of the current, and for this purpose the refrigerator will be modified in so far as concerns the cooling-box. Such modification is shown in Fig. 2, the box D being a tank capable of holding water, having an inlet at *p* and an outlet at *r*. A series of tubes (arranged as may be desired—vertically will be best) is set in the box, as shown at I. These may open into the cold-air box E in the same manner as for the ice-box. The cold well or spring water may be made to flow through *p* by a ram or otherwise, and, filling up D, discharge at *r*, thus surrounding and cooling all the tubes I; or the tank may be otherwise supplied with cold water. As the air within is cooled it descends into E, flowing thence into the apartment to be cooled, and, as the cooling goes on, the moisture, condensing from the air, will be deposited upon the sides of the tubes, and, trickling down, may be caught in the trap E, or by other suitable arrangements, and be discharged, and the operation will be otherwise as before described. By this means a dairy or other room may be kept dry and cool at little or no expense for the cooling material. For further disinfecting, a charcoal-box or other suitable agent may be employed, as shown at B; or by placing it at *y*, where the warm and moist air passes over to be cooled and dried.

Instead of a single opening or flue in or at the bottom of the ice-box, or below the lowest level of the ice, several may be employed in combination with one cooling-reservoir; or, where the apartment is of considerable size, more than one reservoir, for the cooling materials and openings or flues, in like manner, may be arranged, either to increase the circulation or to reduce the temperature and drying, or both, as may be required.

The discharge-pipe F may be of different lengths, according as the blast is to be more or less forcible, the higher the column the greater being the weight and velocity of the discharge.

I claim—

1. The combination of a descending conduit or cold-air flue, or either, with a reservoir for containing cooling materials, substantially in the manner and for the purposes described.

2. In a cooling or ventilating apparatus, substantially as herein described, the use of tubes in the reservoir or receptacle of cooling material.

3. In a closed refrigerating-chamber, an open-bottomed cooling-reservoir, provided with an aperture for the ingress of the air above the cooling material, in combination with a drip to prevent the falling of the water into the chamber below the cooling-reservoir, substantially as described.

4. In a refrigerating-chamber, an ice-box, open above and below, and provided with a grate for supporting the ice.

5. In a refrigerating-chamber, a receptacle for cooling material divided into two compartments, the one serving to support the cooling material and the other to allow the settling of the cooled air, substantially as described.

AZEL STORRS LYMAN.

Witnesses:
JAS. N. PIPER,
STEPHEN CUTTER.